United States Patent
Tsunoda et al.

(10) Patent No.: US 7,265,294 B2
(45) Date of Patent: Sep. 4, 2007

(54) FEEDER AND HARNESS WIRING STRUCTURE USING SAME

(75) Inventors: Mitsunori Tsunoda, Shizuoka (JP); Akira Tsubaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 231 days.

(21) Appl. No.: 10/519,690

(22) PCT Filed: Aug. 28, 2003

(86) PCT No.: PCT/JP03/10992

§ 371 (c)(1), (2), (4) Date: Jan. 10, 2005

(87) PCT Pub. No.: WO2004/003450

PCT Pub. Date: Apr. 22, 2004

(65) Prior Publication Data

US 2006/0056165 A1    Mar. 16, 2006

(30) Foreign Application Priority Data

Oct. 11, 2002 (JP) .............................. 2002-298699
Dec. 2, 2002 (JP) ........................... 2002-2349724

(51) Int. Cl.
    *H02G 3/04* (2006.01)
(52) U.S. Cl. ................... 174/72 A; 174/68.3; 174/135; 174/48
(58) Field of Classification Search ............. 174/72 A, 174/68.3, 48, 69, 99 E, 70 R, 135, 97; 361/826, 361/601; 439/11, 34; 248/629
See application file for complete search history.

(56) References Cited

U.S. PATENT DOCUMENTS

| | | | |
|---|---|---|---|
| 6,492,592 B1 * | 12/2002 | Murofushi et al. | ....... 174/72 A |
| 6,575,760 B2 | 6/2003 | Doshita et al. | |
| 7,042,738 B2 * | 5/2006 | Tsubaki | .................... 361/826 |
| 2002/0005014 A1 | 1/2002 | Doshita et al. | |
| 2003/0184119 A1 | 10/2003 | Doshita et al. | |

FOREIGN PATENT DOCUMENTS

| | | |
|---|---|---|
| DE | 10118205 A1 | 10/2001 |
| JP | 2001-354085 | 12/2001 |
| JP | 2002-2288 | 1/2002 |

* cited by examiner

*Primary Examiner*—Dhiru R. Patel
(74) *Attorney, Agent, or Firm*—Kratz, Quintos & Hanson, LLP

(57) ABSTRACT

In order to attain a compact and simplified feeder assembly 1, the feeder assembly adopts a space receiving a wiring harness 6 to be bend, a sliding member 7 provided in the wiring harness, and a sliding guide to guide the sliding member in the space side. The wiring harness is bent to loop or U-shape. The space is provided in a protector 4. The sliding guide 5 is formed in mountain shape or slanted. The sliding guide 5 is a pair of rails, guiding through-holes or walls opposed to each other, the wiring harness 6 is inserted between the pair of rails, and the sliding member 7 is a spherical member which contacts to slide freely on the pair of rails or walls, or an axis which engages with the guiding through-holes. An insulating cover of each electric cable of the wiring harness 6 or a protection tube of the circumference of the wiring harness 6 may be formed with a material which hardly degrades the rigidity with temperature and humidity changes or a loop portion 6b may be provided with a curved rigid member openable at a hinge.

13 Claims, 11 Drawing Sheets

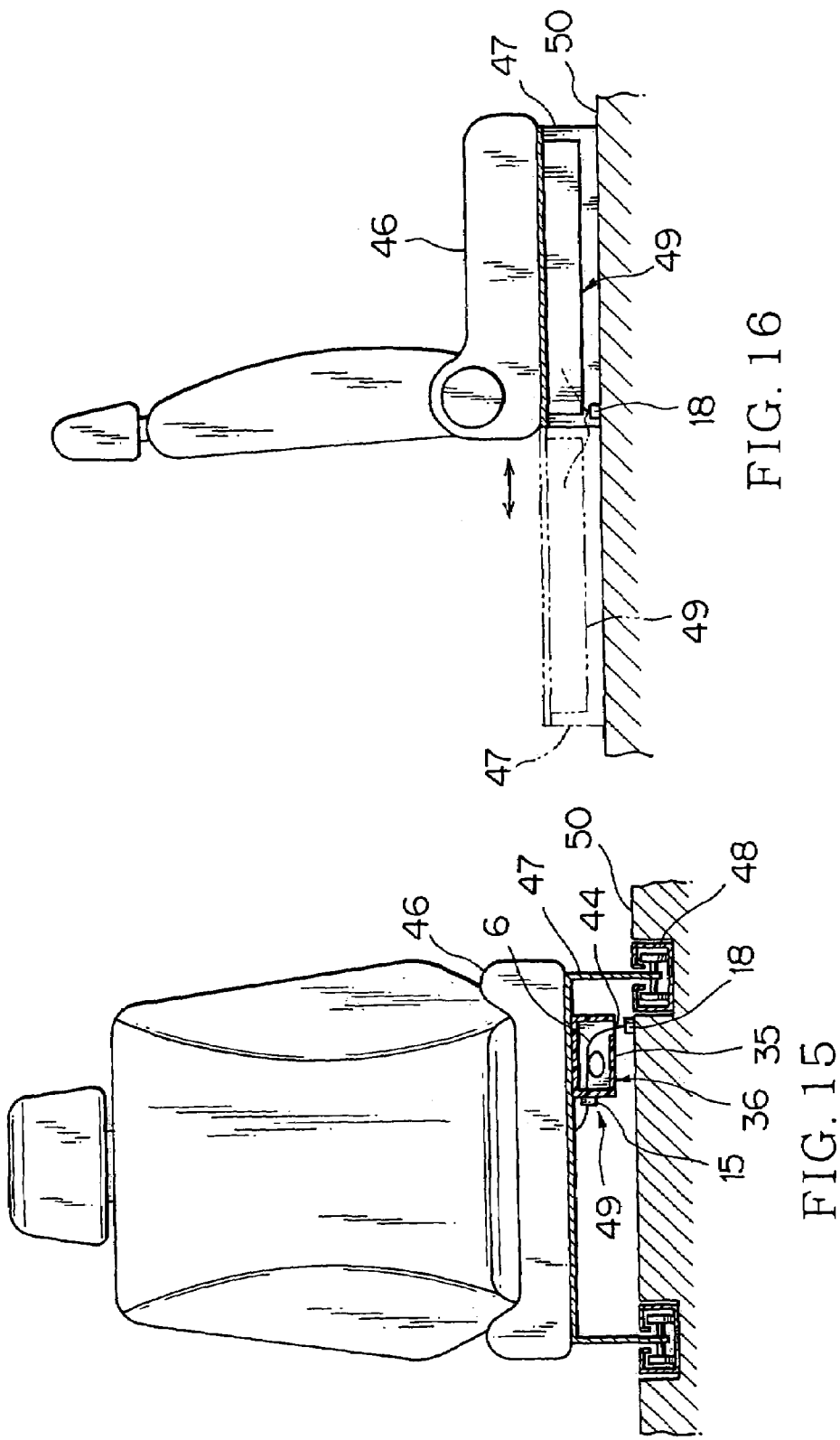

FEEDER AND HARNESS WIRING STRUCTURE USING SAME

TECHNICAL FIELD

The present invention relates to a feeder assembly which absorbs an excess length of a wiring harness when moving a sliding structure in order to feed the sliding structure such as a sliding door or sliding seat of a vehicle from a power source.

RELATED ART

FIGS. 21 and 22 show a harness arrangement structure utilizing a conventional feeder assembly (for example, see JP,2001-354085,A)

A feeder assembly 61 is attached to a sliding door 62 of a vehicle. The feeder assembly 61 is provided with a base 63 and cover (not shown) made of synthetic resin, and a metal flat spring 65 which receives a sag (excess length) by urging upward a wiring harness 64 in the protector.

The base 63 is fixed vertically to a inner panel 66 of the sliding door 62 and the cover is locked to the base 63 by a locking means. The flat spring 65 is fixed to the base 63. A narrow opening 67 for guiding out the wiring harness is provided in the front of the protector and an elongated opening 68 is provided in the underneath the protector.

The wiring harness 64 is received crookedly in the protector and one end of the wiring harness 64 is arranged to an auxiliary apparatus to the side of the sliding door through the opening 67 of the front side and other end is arranged to the side of a vehicle body 71, through the underneath opening 68 and through a step over, while being supported by a harness fixing portion near a step 69 and is connected to a wiring harness (not shown) to the side of the vehicle body (power supply side). "Front side" refers to the front side of the vehicle.

When the sliding door 62 in FIG. 21 is fully closed, the wiring harness 64 is depressed upward by the flat spring 65 and is stretched to the backside (facing to the harness fixing portion 70) from the underneath opening 68 of the protector. When the sliding door 62 is opened by sliding to backside, the wiring harness 64 is tend to sag downward but the flat spring 65 urges to absorb the sag. When the sliding door 62 is fully opened as in FIG. 22, the wiring harness 64 bends downward the flat spring 65 and is bent in a small radius and stretched to the front side (facing to the harness fixing portion 70). The sliding door 62 is moved outward (to the direction apart from the vehicle body 71) when opened from the, closed state in FIG. 21.

However, in the conventional feeder assembly and the harness arrangement structure, since the sag of the wiring harness 64 is absorbed by urging upward, the structure enlarges in height. As is anticipated, a large attachment space is not available in the sliding door, an attachment position is limited or an attachment is not possible, due to the sliding space of windows and the position of auxiliary apparatus for type of vehicles. Moreover, since many parts, such as metal flat spring 65, a member fixing the metal flat spring 65 to the base 63, a cap supporting stably the wiring harness 64 at the tip of the flat spring 65 and the like, are required, more cost of parts and assembly hours are necessary.

Wiring harness of insulating coating cable may be utilized in the structure other than the feeder assembly stated but special cable such as cabtire cable, curled cord or the like has a difficulty applying for many kinds of sliding doors and for changing design of circuit.

An object of the present invention is to provide a feeder assembly and a harness arrangement structure utilizing it. The feeder assembly and harness arrangement structure are capable of preventing from the height enlargement so that the assemblage can be made with a saved-space in a sliding structure body such as a sliding door and an excess length of a wiring harness can be absorbed by few parts without flat spring. Furthermore, they can use regular type cables and are applicable to many kinds of sliding doors.

DISCLOSURE OF THE INVENTION

In order to attain the above object, a feeder assembly of the present invention is provided with a receiving space in which a wiring harness is bent, a sliding member provided in the wiring harness, and a sliding guide to guide the sliding member. Thereby, when a sliding structure body such as a sliding door and the like engaged slidably with a fixed structure body such as a vehicle body and the like moves back and forth, the sliding member of the wiring harness arranged from the space of the sliding structure body to the fixed structure body side moves along the sliding guide in the space side and a loop portion or a bent portion of the wiring harness expands and contracts in the space so that the excess length of the wiring harness is absorbed when the loop portion expands the diameter or the bent portion contracts.

Thereby, as the sliding structure body slides, the sliding member moves along the sliding guide, and the loop portion or the bent portion of the wiring harness expands and contracts vertically or horizontally in the space so that the space is saved in the height direction compared to the feeder assembly utilizing a conventional flat spring. The rigidity of the wiring harness forms the loop portion or the bent portion without using a flat spring and hence absorbs the excess length of the wiring harness.

In the feeder assembly, the feeder assembly is provided with the receiving space in which the wiring harness is bent in loop shape, and the sliding guide to guide the sliding member in the direction to which the loop portion of the wiring harness expands or contracts.

Thereby, when the sliding structure body such as a sliding door and the like engaged slidably with the fixed structure body such as a vehicle body and the like moves back and forth, the sliding member of the wiring harness arranged from the space of the sliding structure body to the fixed structure body side moves along the sliding guide in the space side and the loop portion of the wiring harness expands and contracts in the space so that the excess length of the wiring harness is absorbed when the loop portion expands in the diameter and the wiring harness is pulled out to the fixed structure body side from the space when the loop portion contracts the diameter. Thereby, as the sliding structure body slides, the sliding member moves along the sliding guide, and the loop portion of the wiring harness expands and contracts in the radial direction vertically or horizontally in the space so that the space is saved in the height or crosswise direction compared to the feeder assembly utilizing a conventional flat spring. The rigidity of the wiring harness forms the loop portion without using a flat spring and hence absorbs the excess length of the wiring harness.

In the feeder assembly, the feeder assembly is provided with the receiving space in which the wiring harness is bent in U-shape, and the sliding guide to guide the sliding member in the direction to which the bent portion of the wiring harness expands or contracts.

Thereby, when the sliding structure body such as a sliding door and the like engaged slidably with the fixed structure body such as a vehicle body and the like moves back and forth, the sliding member of the wiring harness arranged from the space of the sliding structure body to the fixed structure body side moves along the sliding guide in the space side and the excess length of the wiring harness is absorbed when the wiring harness is bent. Thereby, as the sliding structure body slides, the sliding member moves along the sliding guide, and the wiring harness is bent in U-shape vertically and horizontally in the space so that the space is saved in the height or crosswise direction compared to the feeder assembly utilizing a conventional flat spring. The rigidity of the wiring harness forms the loop portion without using a flat spring and hence absorbs the excess length of the wiring harness.

In the feeder assembly, the feeder assembly is characterized by that the space is provided in a protector and the sliding guide is provided in the lengthwise direction of the protector.

Thereby, when a sliding structure body such as a sliding door and the like engaged slidably with a fixed structure body such as a vehicle body and the like moves back and forth, the protector provided in the sliding structure body moves with the sliding structure body and the fixed sliding member of a wiring harness arranged from the protector to the fixed structure body side moves along the sliding guide in the protector and the loop portion or the bent portion of the wiring harness expands or contracts in the protector and the excess length of the wiring harness is absorbed when the loop portion expands the diameter or the bent portion contracts and the wiring harness is pulled out to the fixed structure body side when the loop portion contracts the diameter. Thereby, as the sliding structure body slides, the sliding member moves along the sliding guide, and the loop portion of the wiring harness expands or contracts in the radial direction or the bent portion of the wiring harness expands or contracts in the vertical or horizontal protector so that the space is saved in the height or crosswise direction compared to the protector structure utilizing a conventional flat spring. The rigidity of the wiring harness forms the loop portion without using a flat spring and hence absorbs the excess length of the wiring harness.

In the feeder assembly, the feeder assembly has a sliding guide of mountain shape.

Thereby, as the sliding structure body moves, the sliding member moves to the top of the sliding guide of mountain shape and the loop portion of the wiring harness is forced to be expanded in the diameter and the excess length is assuredly absorbed. The excess length of the wiring harness is absorbed in the expanded radial direction of the loop portion. When the sliding member is positioned at the top of the sliding guide, the loop portion has the largest diameter. As the sliding member moves to the bottom of the sliding guide of mountain shape, the loop portion contracts the diameter and the wiring harness is pulled out of the space or the protector.

In the feeder assembly, the feeder assembly has a sliding guide which is formed in slanted from one end to the other end.

Thereby, as the sliding structure body moves, the sliding member moves upward along the slanted sliding guide and the loop portion of the wiring harness is forced to be expanded in the diameter and the excess length is assuredly absorbed. The loop portion expands the diameter to the direction (crosswise) along the sliding guide and the excess length is absorbed crosswise. As the sliding member moves downward along the slanted sliding guide and the loop portion contracts the diameter and the wiring harness is pulled out of the space or the protector.

In the feeder assembly the feeder assembly has the sliding guide which has a straight portion and a slanted portion followed from the straight portion.

Thereby, a space or a protector having a space is provided in the fixed structure body side such as a vehicle body and a wiring harness is arranged from the space to a sliding structure body side. When the sliding structure body such as a sliding door of a vehicle is opened from the fully closed state, or is fully closed from the nearly closed state, the sliding member moves along the slanted portion of the sliding guide and the wiring harness is bent in U-shape so that the stroke of the thickness direction of the sliding structure body is absorbed and the sag of the wiring harness outside the protector is prevented. When the sliding structure body moves parallel to the fixed structure body, the sliding member moves along the straight portion of the sliding guide.

In the feeder assembly, the feeder assembly is characterized by that the sliding guide is a pair of rails opposed to each other and the wiring harness penetrates between the pair of the rails and the sliding member is a spherical member to contact freely slidable to the pair of the rails.

Thereby, the wiring harness is bent in loop shape between the pair of the rails and its excess length is absorbed. Even though the direction of the sliding member changes due to the bending or swing of the wiring harness, the spherical sliding member always swings smoothly on the pair of the rails.

In the feeder assembly, the feeder assembly is characterized by that the sliding guide is a pair of guiding through-holes or a pair of guiding grooves opposed to each other, and the sliding member has an axis engaging slidably with the guiding through-holes or guiding grooves.

Thereby, the axis is engaged with the guiding through-hole or the guiding groove and the position of the sliding member is always accurately regulated so that the formation of the loop portion of the wiring harness is smoothly and assuredly made. Since the sliding guide does not project in the protector, the space (width) for inserting the wiring harness in the protector can be reduced and the reduction of the space and the protector is attained.

In the feeder assembly, the feeder assembly is characterized by that the sliding guide is a long side wall of the protector.

Thereby, the long side wall of the protector combines with the sliding guide, the structure is simplified and attains a low cost. The protector is made compact since the space inside the protector is fully utilized, that is (there is no useless space between the wall of the long side and the sliding guide).

In the feeder assembly, the feeder assembly is characterized by that a long opening for swinging the wiring harness is provided in the lengthwise direction of the protector and an opening of the wiring harness fixing side is provided in one end of the protector.

Thereby, the wiring harness guided in the protector from the one end of the protector is bent in loop shape in the protector or extends almost straight and is guided out of the long opening of the lengthwise direction. As the sliding structure body moves back and forth, the wiring harness swings back and forth along the long opening, and the loop portion or the bent portion expands or contracts.

In the feeder assembly, the feeder assembly is characterized by that an insulating cover of each electric cable constituting the wiring harness is formed with a material which hardly degrades with the change of temperature and humidity.

Thereby, the rigidity of each electric cable, that is, the rigidity of the whole wiring harness is always kept constant (high) and the wiring harness can keep the shape even at high temperature and high humidity and the wiring harness always bends in loop or U-shape. Then, the excess length of the wiring harness is further smoothly and assuredly absorbed. Only the material of the insulating cover of the electric cable is changed and the shape of the electric cable is same as that of the conventional cable so that it has a high versatility.

In the feeder assembly, the feeder assembly is characterized by that a protection tube covering the outer circumference of the wiring harness is formed with a material which hardly degrades with temperature and humidity changes.

Thereby, the rigidity of the wiring harness is always kept constant (high), and the wiring harness can keep the shape even at high temperature and high humidity and always bend in loop or U-shape. Then, the excess length of the wiring harness is further smoothly and assuredly absorbed. Only the material of the protection tube is changed and the shape of the protection tube is same as that of the conventional tube so that it has a high versatility.

In the feeder assembly, the feeder assembly is characterized by that a curved rigid member openable at a hinge is provided in the loop portion or the bent portion of the wiring harness.

Thereby, the loop portion or the bent portion of the wiring harness is always kept curved shape by the rigid member. For example, as the sliding structure body moves back and forth, when the loop portion contracts the diameter the rigid member rotates to the closing direction at the hinge to correct the loop a smaller diameter, when the loop portion expands the diameter the rigid member rotates to the opening direction at the hinge to correct the loop a larger diameter, and the excess length of the wiring harness is further smoothly and assuredly absorbed.

A harness arrangement structure utilizing the feeder assembly is characterized by that the space of the feeder assembly is provided in a sliding structure body or a fixed structure body, the sliding structure body engages to slide the fixed structure body, the wiring harness followed to the sliding member is guided out from the space to the fixed structure body or the sliding structure body side, the wiring harness followed to the loop portion is guided out and fixed to the sliding structure body or the fixed structure body side.

Thereby, when the sliding structure body moves back and forth, for example, the harness receiving space provided in the sliding structure body moves with the sliding structure body and swings to the lengthwise direction of the space, the sliding member slides along the sliding guide in the space side, the loop portion or the bent portion of the wiring harness expands or contracts in the space, and the excess length of the wiring harness is absorbed when the loop portion expands the diameter or the bent portion contracts. Thereby, as the sliding structure body slides, the sliding member moves along the sliding guide, and the loop portion of the wiring harness expands or contracts the diameter or the bent portion of the wiring harness expands or contracts in the vertical or horizontal direction in the space so that the space is saved in the height or crosswise direction compared to the feeder assembly structure utilizing a conventional flat spring. The rigidity of the wiring harness forms the loop portion or the bent portion without using a flat spring and hence absorbs the excess length of the wiring harness.

A harness arrangement structure utilizing the feeder assembly is characterized by that the protector of the feeder assembly is provided in a sliding structure body or a fixed structure body, the sliding structure body engages to slide the fixed structure body, the wiring harness followed to the sliding member is guided out from the long opening of the protector to the fixed structure body or the sliding structure body side, the wiring harness followed to the loop portion is guided out and fixed to the sliding structure body or the fixed structure body side.

Thereby, when the sliding structure body moves back and forth, for example, the protector provided in the sliding structure body moves therewith and swings along the long opening of the protector, the sliding member slides along the sliding guide in the protector, the loop portion or the bent portion of the wiring harness expands or contracts in the protector, and the excess length of the wiring harness is absorbed when the loop portion expands the diameter or the bent portion contracts. Thereby, as the sliding structure body slides, the sliding member moves along the sliding guide, and the loop portion of the wiring harness expands or contracts the diameter or the bent portion of the wiring harness expands or contracts in the vertical or horizontal direction in the protector so that the protector is made compact in the high direction compared to the protector utilizing a conventional flat spring. The rigidity of the wiring harness forms the loop portion without using a flat spring and hence absorbs the excess length of the wiring harness.

In the harness arrangement structure using the feeder assembly, the harness arrangement structure is characterized by that the feeder assembly is disposed vertically or horizontally.

For example, if the sliding structure body is a sliding door, the feeder assembly is disposed vertically (lengthwise) and a space is saved in the height direction (the direction perpendicular to the sliding) of the sliding door. If the sliding structure body is a sliding seat, the feeder assembly is disposed horizontally (flatly) and a space is saved in the widthwise direction (the direction perpendicular to the sliding) under the seat.

BRIEF DESCRIPTION OF THE DRAWINGS

FIG. 15 is a front view of an embodiment showing a feeder assembly and a changed harness arrangement structure;

FIG. 16 is a side view showing a feeder assembly and a harness arrangement structure utilizing it;

BEST MODE FOR CARRYING OUT THE INVENTION

Figure 1:
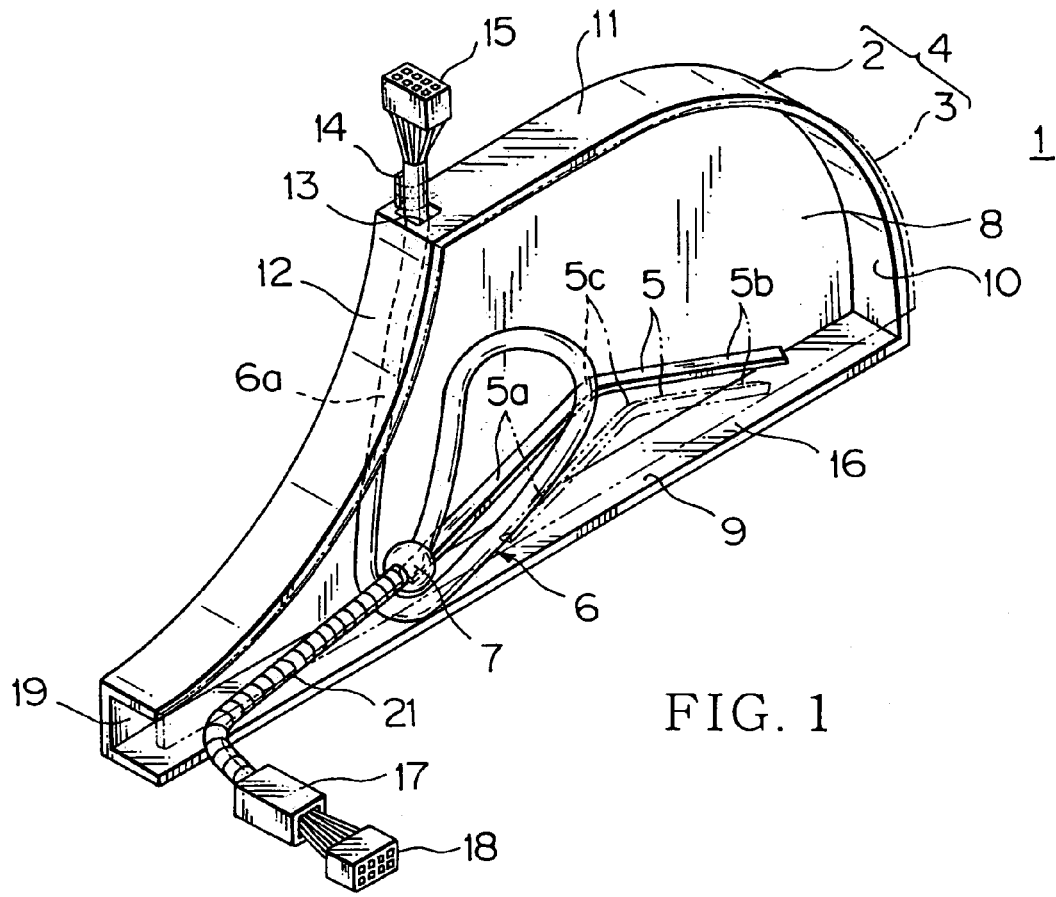
FIG. 1 is a perspective view of a sliding door fully closed showing a first embodiment of a feeder assembly according to the present invention.
Figure 2:
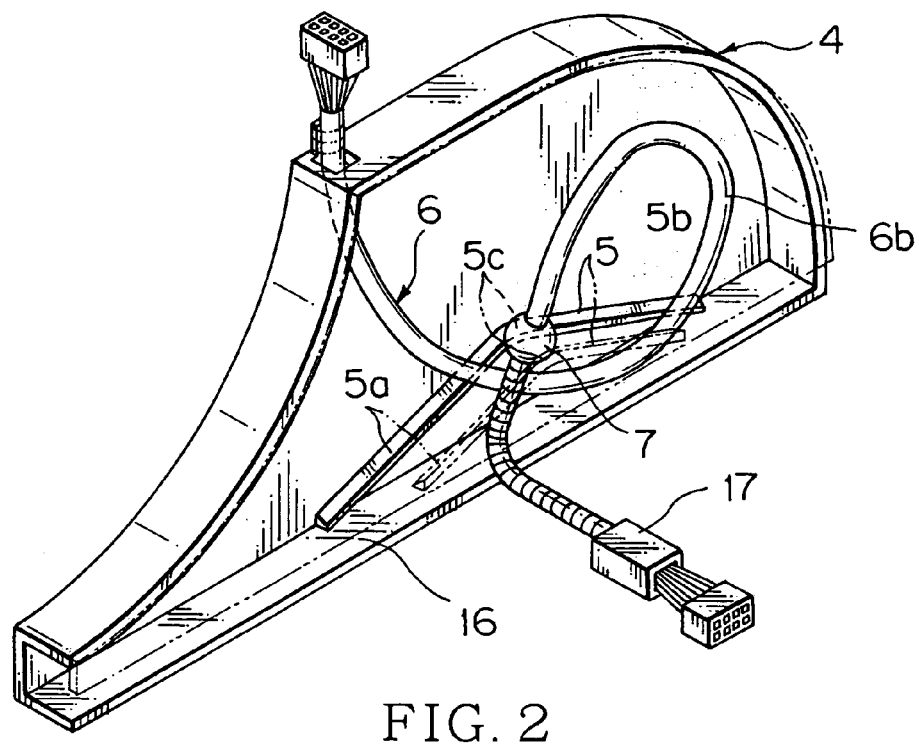
FIG. 2 is a perspective view of a sliding door half opened.
Figure 3:
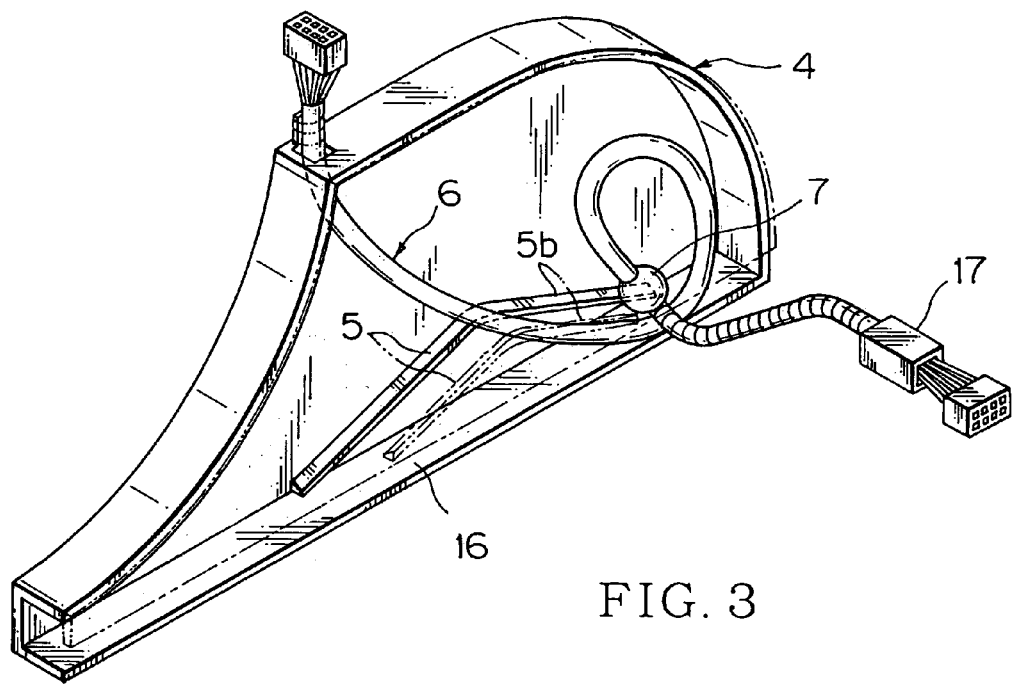
FIG. 3 is a perspective view of a sliding door fully opened.

Detail of embodiments of the present invention is described below referring to drawings. FIGS. 1-3 show a first embodiment of a feeder assembly according to the present invention.

The feeder assembly 1 is longitudinally (vertically) disposed in a sliding door (sliding structure body). FIG. 1 shows the sliding door fully closed, FIG. 2 shows the sliding door half opened and FIG. 3 shows the sliding door fully opened.

As shown in FIG. 1, the feeder assembly 1 is provided with a case 2 made of synthetic resin with a relatively small height, a cover 3 (shown by a chain line) made of synthetic resin attached to the case 2, a pair of sliding guides 5 of generally mountain-shape opposed to the case 2 and the cover 3, and a sliding member 7 which is supported by a wiring harness 6 crooked in loop in the pair of sliding guides 5 and is slidable back and forth.

The front half of the case 2 is formed in generally rectangle shape and the back half is formed in generally slanted shape. The front and back corresponds with those of a vehicle. The case 2 is formed with a vertical base plate 8 and a circumferential wall of the base plate 8. The circumferential wall includes a horizontal lower side wall 9, an front upright wall 10 of crooked shape, an horizontal upper side short wall 11, and a curved wall 12 of the back half following to the upper side wall 11.

A restricted-opening 13 is provided in the upper side wall 11 for guiding the harness and one end of the wiring harness is fixed by a fastener 14 near the opening 13. The wiring harness guided out of the opening 13 is connected with a wiring harness or auxiliary apparatus in the sliding door by a connector 15. The case 2 is fixed to the inner panel of a sliding door (not shown) by fasteners (not shown) such as bolt or locking clip.

The cover 3 of flat shape is disposed parallel and opposed to the base plate 8 and fixed by locking means (not shown) of locking piece and engaging projection and the like along the circumferential walls 10 to 12. The lower end of the cover 3 is positioned to a little higher than the lower wall 9 and a horizontal opening 16 of a long sideways slit shape is formed between the cover 3 and the lower wall 9 and the other end of the wiring harness 6 is guided out of the opening 16, through a harness fastener 17 (fasteners) of a vehicle body (fixed structure body), to connect a wiring harness (not shown) of the vehicle body with a connector 18.

The harness fastener 17 may support rotatably the wiring harness 6 in a circumference direction. A long or circular auxiliary protector of a rectangular-shaped pipe may be provided between the sliding door and the vehicle body in place of the harness fastener 17 to receive the auxiliary protector the car body side to the direction of the vehicle width when opening or almost closing the sliding door.

The case 2 and cover 3 form a protector 4. A long sideways space is formed in the protector 4 for receiving harness. The opening 16 to the lower side of the protector 4 is extended straight from the upright wall 10 to an opening 19 of the back end of the case 2. The opening 19 of the back end may be closed by a vertical wall (not shown).

The sliding guide 5 rises up like a mountain from the lower wall 9 (the lower end of the base plate 8) and the lower end of the cover 3, and is formed in the base plate 8 and the vertical base plate of the cover 3 symmetrically. The sliding guide 5 of the cover 3 is shorter than the sliding guide of the base plate 8 to the size of the opening 16. The shape of the sliding guide 5 may be mountain, bent or linearly slanted and has an almost equal length of a slanted portion $5a$ and $5b$ at the front half and the back half of the protector 4 respectively.

Figure 4:
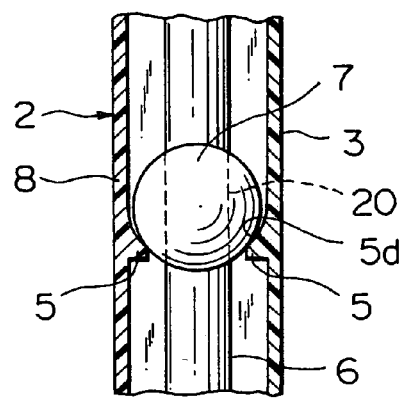
FIG. 4 is a vertical sectional view showing an embodiment of a sliding member and sliding guide in a protector.

As shown in FIG. 4 of a sectional view of an embodiment of the sliding guide 5, the sliding guide 5 is provided saliently inside the base plate 8 of the case 2 and the cover 3 in a rail shape. The rail 5 is provided upper side with a curved surface $5d$ which has a section of generally triangle shape and supports a sliding member 7 of ball shape. The projected length of the rail 5 is set for the wiring harness 6 to pass through between the pair of rails 5 freely. There is a space between the pair of rails 5 for the insertion of the harness.

The sliding member 7 of ball shape is made of synthetic resin and is divided in two pieces each side and holds the wiring harness 6 inside a through-hole to lock it by means of locking claw and locking means (not shown) such as locking recess. When the wiring harness 6 is covered by a corrugated tube 21 made of synthetic resin at the circumference and an inside projection of the sliding member 7 is engaged with a concave groove of the corrugated tube 21 in the circumferential direction, the sliding member 7 is movable freely in the circumferential direction and is resisted (fixed) to move to the longitudinal direction of the harness. The outer diameter of the sliding member 7 is set larger than the width of the underside opening 16 so that the sliding member 7 does not bounce out of the opening 16.

Upper and lower construction of a pair of rails 5 may also hold the wiring harness 6 between the upper and lower rail 5 without dropping. The section shape of the rail 5 may set as depending the shape of the sliding member 7. It is also possible that the sliding member 7 is not divided and the wiring harness 6 is inserted in the center through-hole 20 (FIG. 4) and is fixed by taping a projected piece (not shown) to the longitudinal direction of the harness. The sliding member 7 of ball shape may be formed in a protector tube such as a corrugated tube of the circumference of a wiring harness.

For the rail 5 and the sliding member 7 in FIG. 4, the sliding member 7 contacts (slides) the rail 5 by utilizing the weight of the wiring harness 6 and hence a simple structure and low cost is attained. FIG. 1 shows the sliding member 7 and the sliding guide 5 of the embodiment of FIG. 4.

Figure 5:
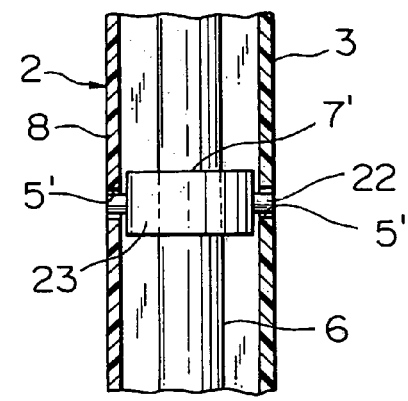
FIG. 5 is a vertical sectional view showing other embodiment of a sliding member and sliding guide in a protector.

FIG. 5 shows other embodiment of a sliding guide. The sliding guide 5' is formed with a guiding through-hole (cam through-hole) penetrating in the base plate 8 of the case 2 and the cover 3. An axis 22 of a sliding member 7' is engaged with the guiding through-hole 5' and slides freely. Front and back ends (lower end) of the through-hole 5' are not opened at the lower end of the cover 3 so that the axis 22 does not bounce out of the cover 3.

The sliding member 7' is made of synthetic resin and is provided with an annular portion 23, which is held and fixed by the wiring harness 6 or fixed by engaging with the concave groove of the corrugated tube 21 (FIG. 1) freely in the circumferential direction, and the pair of axes 22 projected in the radial direction of the annular portion 23. The annular portion 23 can be divided in each side and fixed mutually by locking means, it can be fixed to the wiring harness 6 by taping a projected piece (not shown), or it may be formed integrally to the protector tube of the circumference of the wiring harness.

At the embodiment of FIG. 5, the sliding position of the sliding member 7' is assuredly regulated by the through-hole 5' so that the contraction of the wiring harness 6 is carried out with an accurate diameter in the protector 4 and is prevented from the up-and-down backlash.

When the sliding door fully closed-shown in FIG. 1, the sliding member 7 is positioned to the back end (lower end of the back-half slanted portion 5a) of the sliding guide 5. The wiring harness 6 is inclined upward along the slanted portion 5a from the sliding member 7, forming a small ring downward at the back side of the protector 4, intersecting the harness back part 21, and uprising to the opening 13 to the upper side along the back wall 12 in bent as in the numeral 6a. The harness back part 21 is stretched backward to the direction of the harness fastener 17 of the vehicle body side through the lower opening 16.

When the sliding door half opened (the sliding door is opened backward to the half of a full stroke) shown in FIG. 2, the harness fastener 17 of the vehicle body side is immobile and the protector 4 moves back a half stroke with the sliding door and thereby the sliding member 7 goes up along the backside slanted portion 5a of the sliding guide 5 and almost reaches at a top 5c of the sliding guide 5.

Thereby, the wiring harness 6 forms a large loop in the front half of the protector 4 and is not loosened between the lower opening 16 and the harness fastener 17, and is received in the protector 4 through the lower opening 16 in a loop shape. The excess length (looseness) of the wiring harness 6 between the sliding door half opened and the vehicle body is assuredly received.

When the sliding door fully opened as shown in FIG. 3, the protector 4 moves back with the sliding door and the sliding member 7 downs along the slanted portion 5b of the front half of the sliding guide 5 to be positioned to the front end of the slanted portion 5. The wiring harness 6 turns to be a reduced loop in the front half of the protector 4 and is lead out forward to the harness fastener 17 of the vehicle body. The harness 6 swings back and forth along the lower opening 16 when opening and closing the sliding door.

The sliding member 7 (7') slides along the sliding guide 5 (5') of generally mountain shape when opening and closing the sliding door so that the wiring harness 6 expands in loop shape and the excess length is absorbed in the protector 4, or contracts in loop shape in the protector 4 and is guided out of the vehicle body, and then the contraction of the wiring harness 6 is smoothly and assuredly made.

Since the harness back part 21 from the sliding member 7 to the harness fastener 17 in FIG. 1 is exposed to outside the protector, it is preferable to cover it with a flexible protective tube (exterior member) (numeral 21) such as a corrugated tube for water-proofing and dust-proofing.

The wiring harness from the sliding member 7 to the upper opening 13 is bent in loop so that it is preferable to increase its rigidity (if its portion is soft, it can not form a loop and the loop collapses). It is preferable not to degrade the rigidity of the wiring harness 6 when atmospheric temperature and humidity are high.

Figure 6:
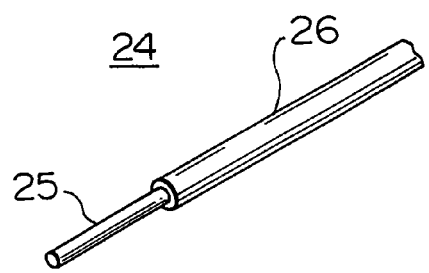
FIG. 6 is a perspective view showing an embodiment of a cable constituting a wiring harness.

For this reason, an insulating cover 26, which covers core wire 25 of each electric cable 24 constituting the wiring harness 6 in FIG. 6, is made of polyethylene, fluorocarbon resin or the like which is not affected by temperature. As in FIG. 7, it is also preferable to cover a plurality of electric cables 24' (a bundle of electric cables) by a protection tube 28 the rigidity of which is not degraded by temperature or humidity, same as in FIG. 6. It is also effective to adopt the structures of FIGS. 6 and 7 at the same time (both the insulating cover 26 and the protection tube 28).

Figure 7:
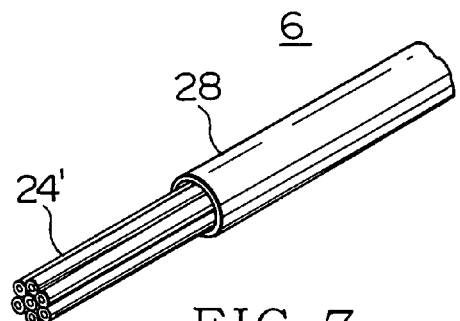
FIG. 7 is a perspective view showing an embodiment of a wiring harness.

The construction shown in FIGS. 6 and 7 (resin material with stable rigidity) is also adapted to not only the wiring harness 6b following inside the protector 4 but the wiring harness (noted by numeral 21) following outside from the sliding member 7 (FIG. 1).

Figure 8A:
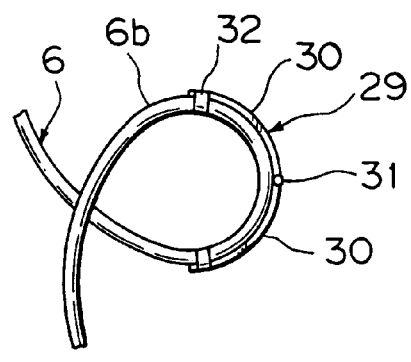
FIG. 8A shows an embodiment of a rigid member and a front view of a wiring harness in a reduced diameter.
Figure 8B:
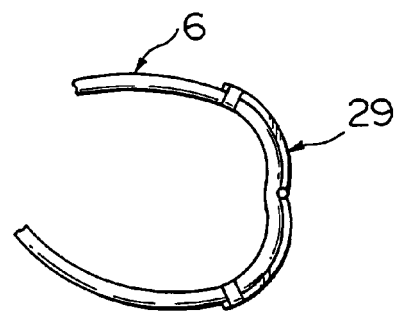
FIG. 8B shows an embodiment of a rigid member and the front view of the wiring harness in an expanded diameter.

As shown in FIG. 8A and FIG. 8B, a rigid member 29 made of synthetic resin or metal with a curved shape (circular arc) may be attached to the outer surface of the bent portion 6b (loop) of the wiring harness 6 so that the wiring harness 6 can be easily made a loop. The rigid member 29 is formed with a pair of curved plates 30 which are rotatable (openable) at a central hinge (fulcrum) 31. The curved plate 30 may be bent in the width direction (radial direction of harness) and is fixed to the wiring harness by a tape 32 and the like.

In the case of the rigid member 29 made of synthetic resin, the hinge 31 may be a thin hinge. The rigid member 29 works as an auxiliary protector which protects the wiring harness 6 from the friction of the inner surface of the protector 4. The shape of the rigid member 29 is not limited to a plate but may be a bent rod.

When the sliding door fully closed or opened, as shown in FIG. 8A, the wiring harness 6 becomes a reduced diameter and the rigid member 29 rotates to the closing direction to keep the loop of the wiring harness 6. When the sliding door half opened, as shown in FIG. 8B, the wiring harness 6 expands the diameter and the rigid member 29 rotates to the direction of open to keep the loop of the wiring harness 6. Thus, the loop of the wiring harness 6 is kept by the rigid member 29 and the excess length of the wiring harness 6 is assuredly received when the sliding door opened and closed.

Figure 9:
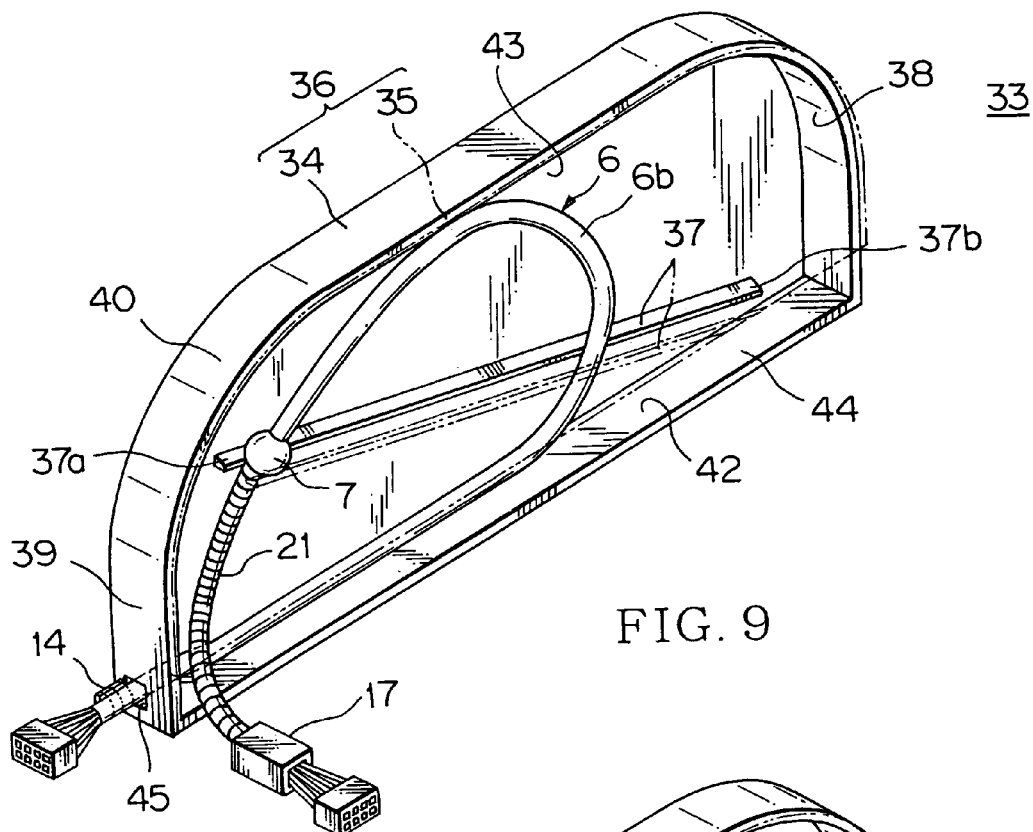
FIG. 9 is a perspective view of a sliding door fully closed showing a second embodiment of a feeder assembly according to the present invention.
Figure 10:
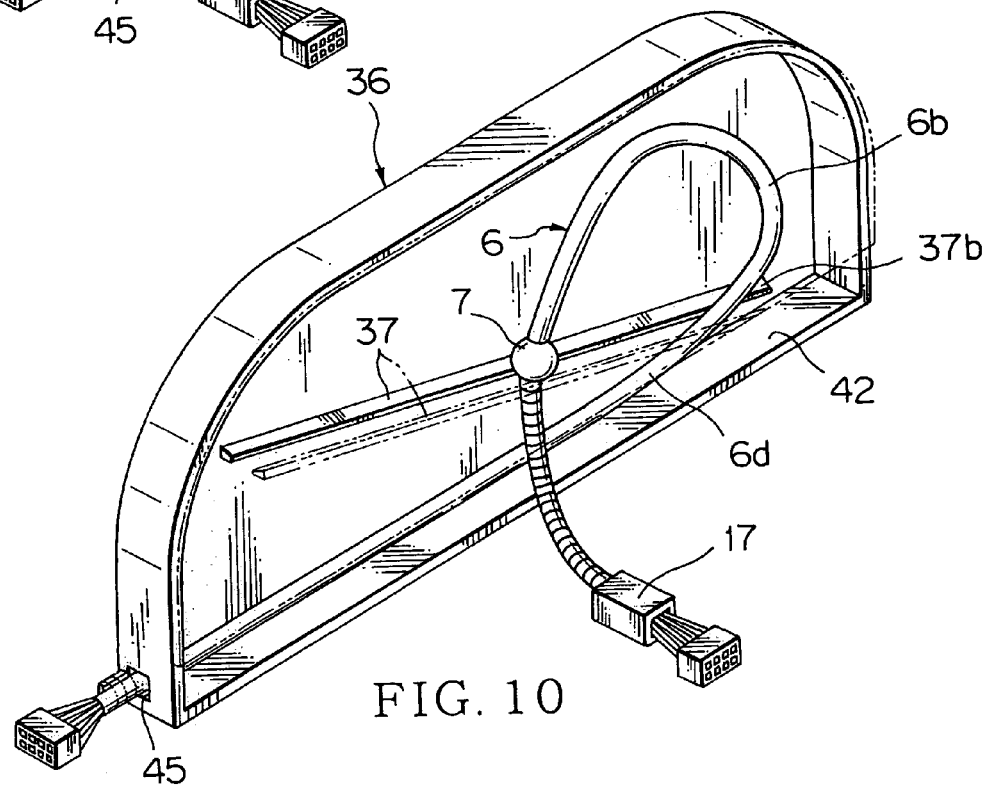
FIG. 10 is a perspective view of a sliding door half opened;.
Figure 11:
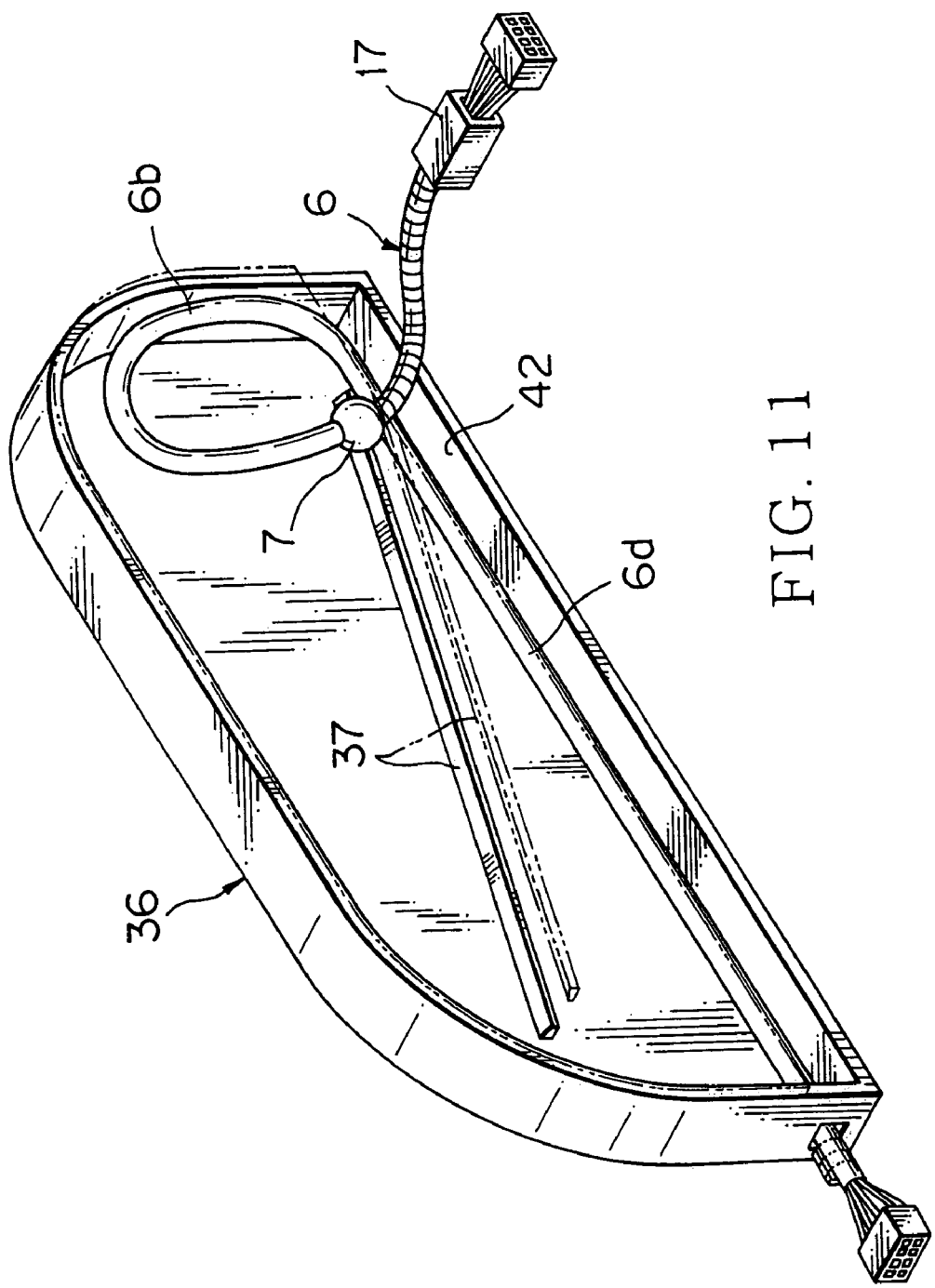
FIG. 11 is a perspective view of a sliding door fully opened.

FIGS. 9 to 11 show the second embodiment of the feeder assembly according to the present invention.

A feeder assembly 33 is provided lengthwise (vertically) in a sliding door (sliding structure body) of a vehicle. FIG. 9 is the sliding door fully closed, FIG. 10 half opened, and FIG. 11 fully opened. The same numerals as in FIG. 1 are used for the same element and the detailed explanation is omitted.

As shown in FIG. 9, the feeder assembly 33 is provided with a case 34 made of synthetic resin with a relatively small height, a cover 35 (shown by a chain line) made of synthetic resin attached to the case 34, a pair of slanted sliding guide 37 provided opposed to the case 34 and the cover 35, and a sliding member 7 which is supported by a wiring harness 6 crooked in loop between the pair of sliding guide 37 and is slidable back and forth along the sliding guide 37.

A protector 36 is formed with the case 34 and the cover 35. An long sideways space is formed in the protector 36 for receiving a harness. The case 34 is formed in a long sideways rectangle and is provided above a front wall 38 and back wall 39 with a curved portion 40 along the looped bent portion 6b of the wiring harness 6. An upper wall 41 and lower wall 42, which are parallel to each other, together with the front wall 38 and back wall 39 form a circumferential wall of a vertical base plate 43. An long sideways opening 44 of horizontal direction for guiding (swinging) out a harness is provided between the lower end of the cover 35 and the lower wall 42. A restricted opening 45 is provided in the lower part of the back wall 39 for guiding a harness (for fixing). One end 21 of the harness 6 is arranged to the vehicle body side from the long sideways opening 44 through a harness fastener 17 and the other end 6d of the wiring harness 6 is arranged to the sliding door side with fixed near at the opening 45 of the back side.

The sliding guide 37 is inclined in straight and an upper end 37a of the sliding guide 37 is positioned above the inside of the back wall 39. A lower end 37b of the sliding guide 37 is positioned lower the inside of the front wall 38. The sliding member 7 fixes the wiring harness 6 and moves up and down along the sliding guide 37 with a back and forth movement.

It is possible to use the embodiment shown in. FIGS. 4 and 5 for the sliding guide 37 and sliding member 7. That is, as shown in FIG. 4, the sliding member 7 of spherical shape of the wiring harness 6 is engaged with and slides freely a pair of inclined rail on each side of the case 34 and the cover 35 of the protector 36. As shown in FIG. 5, the axis 22 of the annular sliding member 7' of the wiring harness 6 is engaged with an inclined guiding through-hole 5' of the case 34 and the cover 35 of the protector 36 to slide freely. FIG. 9 shows the embodiment of FIG. 4.

When the sliding door fully closed shown in FIG. 9., the sliding member 7 is positioned in the upper end 37a of the back of the sliding guide 37. The wiring harness 6 is bent in a long sideways loop with an expanded diameter inside the long sideways protector 36 and hangs along the back wall 39 of the protector 39 from the sliding member 7 and is guided out to the vehicle body side from the back end of the long sideways opening 44.

When the sliding door half opened shown in FIG. 10, the protector 36 moves back with the sliding door. The harness fastener 17 of the vehicle body side does not move and the sliding member 7 moves half along the sliding guide 37 and is positioned halfway at the lengthwise direction of the sliding guide 37. The wiring harness 6 becomes more reduced diameter than that fully closed shown in FIG. 9 and the loop 6b is positioned to the front half of the protector 36. The wiring harness 6d following from the loop 6b extends straight along the lower wall 42 of the protector 36 and reaches to the opening 45 fastening the harness at the back end.

When the sliding door fully opened shown in FIG. 11, the protector 36 moves back with the sliding door and the sliding member 7 moves forward along the sliding guide 37 and downs to the front end (lower end) 37b of the sliding guide 37. The loop 6b of the wiring harness 6 becomes more reduced than that half opened shown in FIG. 10. The harness 6d following from the loop 6b extends straight along the lower wall 42 of the protector 36. The wiring harness 21 following from the sliding member 7 to outside swings back and forth along the long opening 44 when opening and closing the sliding door.

Accordingly, the wiring harness 6 is bent in loop in the long sideways protector 36, and expands and contracts laterally to absorb the excess length. This is different from the conventional plate spring, which absorbs the excess length of a harness upward, so that the protector 36 is made more compact in the height.

The high rigid structure of electric cable 24 in FIG. 6 and wiring harness in FIG. 7 and the constitution of rigid member shown in FIGS. 8A and 8B are also adapted to the embodiments in FIGS. 9-11. As in the case of the embodiment described, the resulting effect keeps the rigidity of the wiring harness 6 at high temperature and high humidity and makes always the wiring harness loop and keeps the loop and attains smoothly and assuredly to absorb the excess length.

The feeder assembly of each embodiment described above is adapted to several kinds of sliding doors besides a sliding door of a vehicle and also to sliding structure body such as a sliding seat of a vehicle described below. In this case, the harness arrangement structure from a vehicle body to a sliding door corresponds to that from a fixed structure body to a sliding structure body.

The case 2, 34 may be formed integrally with the cover 3, 35 to form the protector 4, 36 if they are formed with resin molding. The sliding guide 5, 37 may be formed separately from the protector 4, 36 and may be fixed thereto 4, 36. One sliding guide 5, 5', 37 may be formed in the case 2, 34 or the cover 3, 35 without a pair and can slide the sliding member 7, 7'. If the sliding guide 5, 5', 37 is provided in the case 2, 34, it is preferable for the sliding member 7, 7' to contact inside the cover 3, 35 without backlash. The guiding through-hole 5' of the sliding guide may be replaced by a guiding groove. The sliding guide 37 of FIG. 9 may not be a straight slant but may be a curved slant. In this case which is different from the sliding guide 5 of FIG. 1, the one end 37a of the sliding guide 37 is always higher than the other end 37b and the halfway point is always lower than the one end 37a so as that the sliding guide 37 downs gradually from the one end to the other end. The sliding member 7 is not limited to sphere. However, even a sphere it is preferable to have a groove to engage with the pair of rails 5 for sliding.

Since the feeder assembly 1, 33 includes the wiring harness 6 received in the protector 4, 36, the wiring harness 6 is assumed as a part of the feeder assembly 1, 33. The protector 4, 36 may be provided in the vehicle body side instead of the sliding door. In this case, the protector 4, 36 is disposed flat and horizontally in the vehicle body side and the lower wall 9, 42 of the case 2, 34 is opened for the long sideways opening 16, 44 for guiding and swinging the harness. Moreover, without using the fastener 14, the wiring harness 6 may be guided through the restricted opening 13, 45 and may be fixed by a fixing means of the sliding door side.

FIGS. 12 to 16 show the examples in which the feeder assembly is applied to a sliding seat of a vehicle as the third embodiment of the feeder assembly and the harness arrangement structure with its use according to the present invention.

Figure 12:
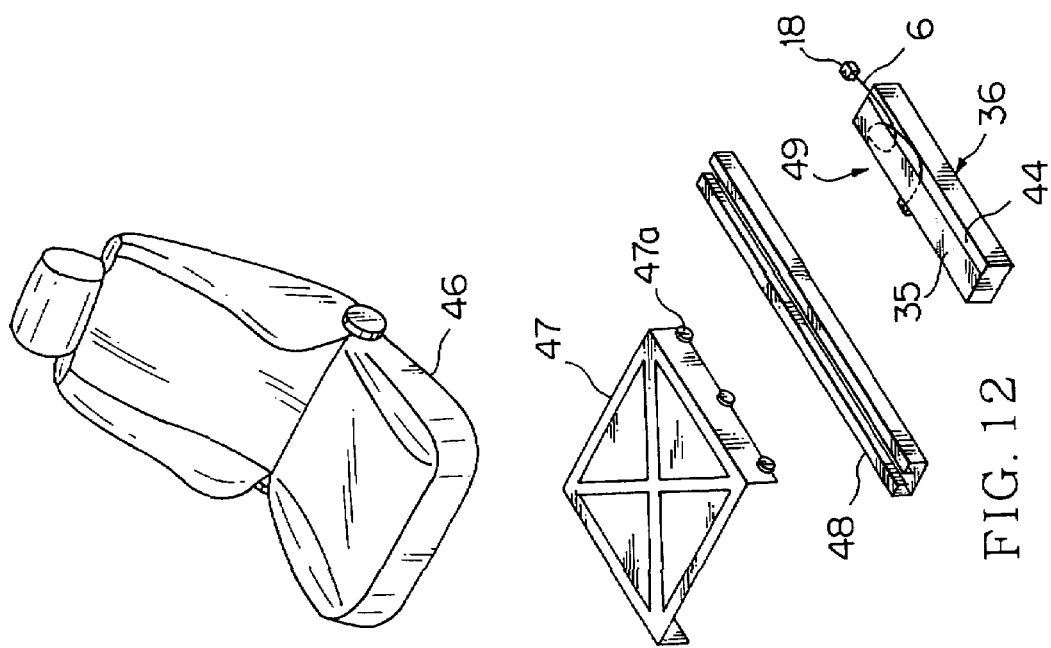
FIG. 12 is an exploded perspective view of a third embodiment wherein a feeder assembly and a harness arrangement structure utilizing it according to the present invention are applied to a sliding seat.

As shown in FIG. 12, a seat 46 is fixed on a seat base 47 of generally gate shape, the seat base 47 is engaged, freely slidable back and forth, with each right and left side rail 48 of the floor side by a pulley 47a, and a feeder assembly 49 is disposed under the seat base 47. The feeder assembly 49 feeds auxiliary apparatus such as passenger detecting sensor, seat heater, power seat, seat belt and side air-bag of the seat side 46. The feeder assembly 49 utilizes the similar embodiment as FIG. 9 and the same numerals are given for the same functions as in FIG. 9 and the detailed explanation is omitted. A sliding member 7' (FIG. 13) and sliding guide 37' utilize the embodiment of FIG. 5.

Figure 13:
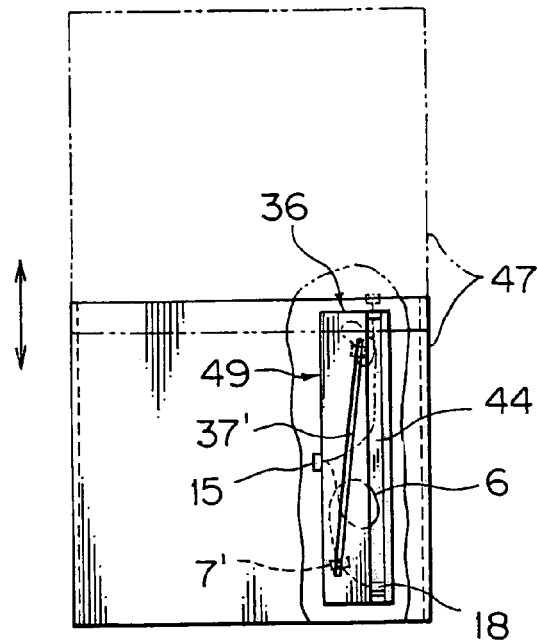
FIG. 13 is a plan view showing a harness arrangement structure when a sliding seat being back and forth.
Figure 14:
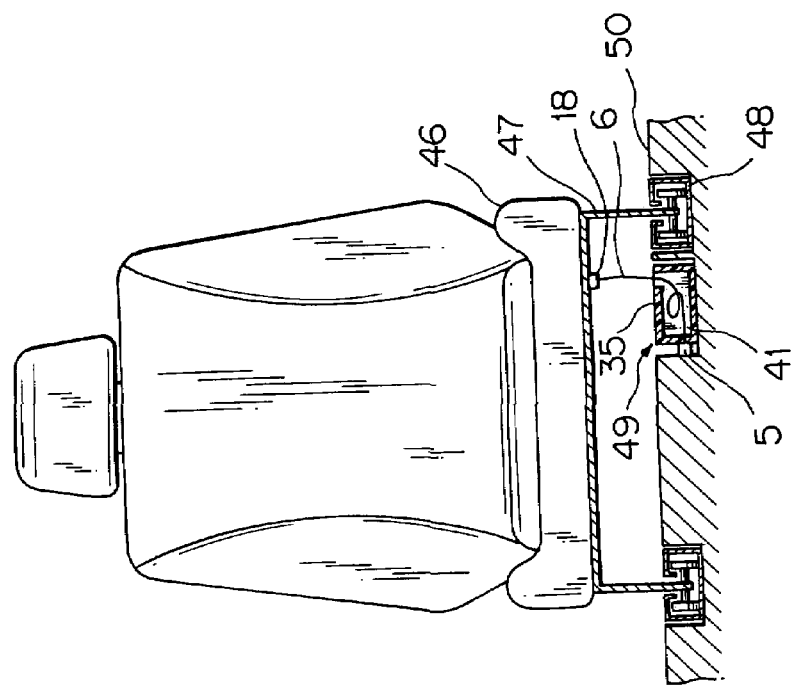
FIG. 14 is a front view showing a feeder assembly and a harness arrangement structure utilizing it.

As shown by a chained line in FIG. 13, the seat base 47 slides widely back and forth and the feeder assembly 49 is disposed horizontally (flatly) on a floor panel 50 as shown in FIG. 14. The feeder assembly 49 is embedded and fixed in a recess of the floor panel 50. The wiring harness 6 of the swinging side is guided out of a long opening 44 of an upper cover 35 and is connected to the wiring harness or auxiliary apparatus (not shown) of the seat 46 at the connector 18 of the seat base 47. The wiring harness of the fixed side is connected to the wiring harness (not shown) of the vehicle body side (power supply side) at the connector 15 of a wall 41 of one side.

As shown by a solid line in FIG. 13, when the seat 46 (seat base 47) is positioned forward, the wiring harness 6 is positioned to the front half of the protector 36 same as in FIG. 9 and is bent to a long sideways loop. A space for receiving the harness is formed in the protector 36. As the seat 46 slides backward as the chained line, the sliding member 7' slides along the slanted sliding guide 37' to the long opening 44 in the protector 36. The wiring harness 6 becomes a reduced diameter at the back of the protector 36 like FIGS. 10 and 11 and the protector 36 absorbs the harness 6 to the amount of the sliding of the seat 46. The wiring harness 6 swings backward along the long opening 44.

Since the protector 36 is long along the opening 44 and short perpendicular to the opening 44, the space of the seat width 46 is saved to the side of the protector 36 and the protector 36 is adapted to all kinds of seat 46. If the wiring harness 6 guided out (exposed) of the protector 36 becomes long, the protector 36 can be shorter to the lengthwise direction than FIG. 13.

FIGS. 15 and 16 show the example where the feeder assembly 49 is disposed to the seat base 47 instead of the floor panel 49. The protector 36 is fixed to the back of the seat base 47 and a space for receiving harness is formed in the protector 36. The long opening 44 is provided in the lower cover 35 of the protector 36 and the wiring harness 6 is guided out downward from the opening 44 and connected to the wiring harness of the floor panel 50 (power supply side) at the connector 18. The connector 15 of the fixed wiring harness is provided in the side of the protector 36 and is connected to the wiring harness of the seat side 46.

As shown in FIG. 16, the feeder assembly 49 moves back and forth with the seat 46 and concurrently the wiring harness 6 (FIG. 15) swings along the long opening 44 of the protector 36 and the excess length of the wiring harness 6 is absorbed in the protector 36 as in FIG. 13 when it is extended and contracted. The embodiment of FIG. 15 shows that the wiring harness 6 from the protector 36 is exposed short and the wiring harness is protected well compared to the embodiment of FIG. 13.

The protector 4, 36 is disposed inside the sliding door or sliding seat in the above embodiment. However, the sliding guide 5, 5', 37 may be provided, for example, integrally to or separately from an inner panel 66 and outer panel, or the inner panel 66 and door trim (not shown) of the sliding door 62 (refer to FIG. 17) without using the protector 4, 36. In this case, the space between the inner panel 66 and the outer panel, or the space between the inner panel 66 and the door trim is utilized to receive the harness.

FIGS. 17 to 20 show the fourth embodiment of a feeder assembly and a harness arrangement structure of its use according to the present invention.

Figure 17:
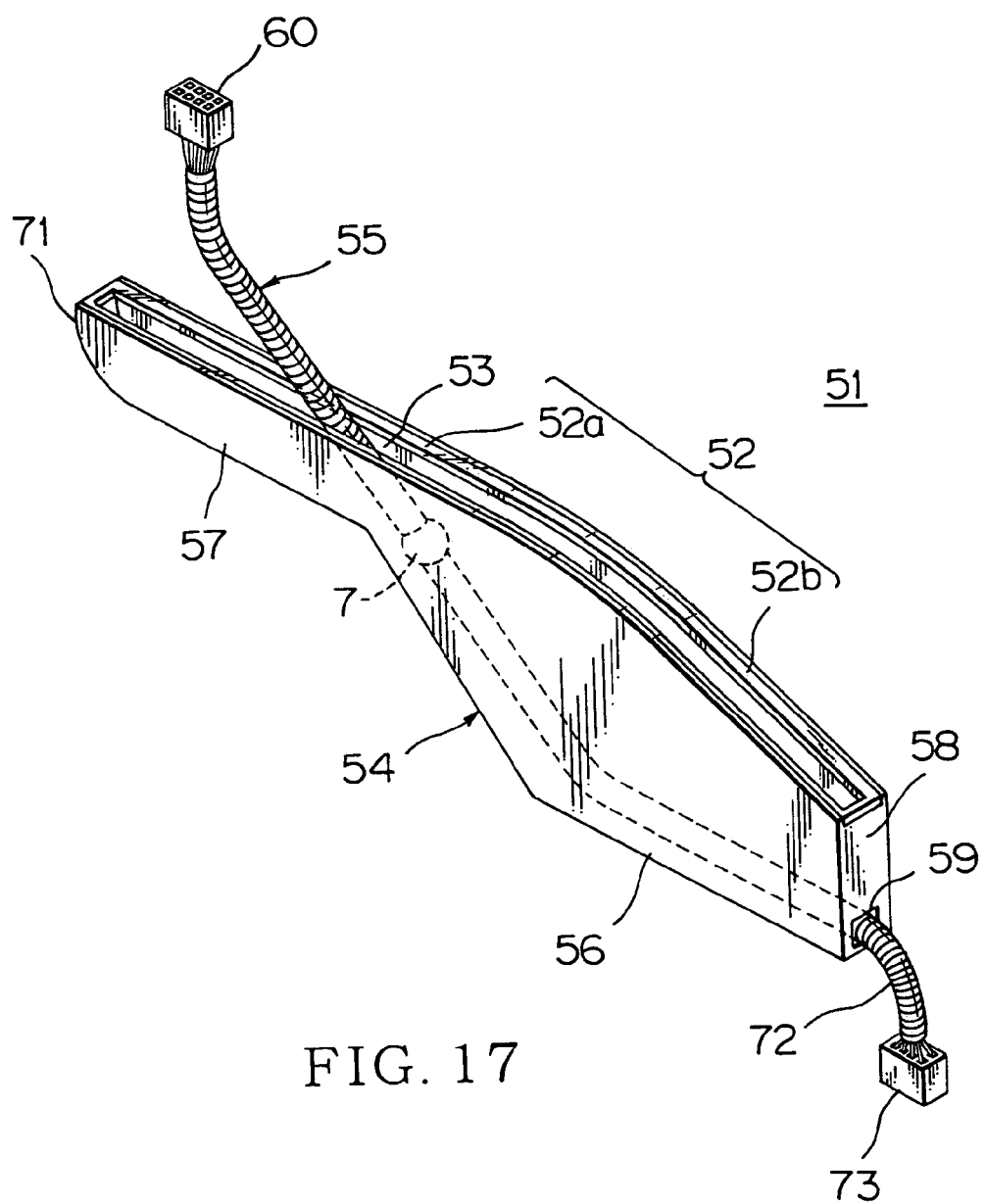
FIG. 17 is a perspective view of an elongated harness showing a fourth embodiment of a feeder assembly according to the present invention.
Figure 18:
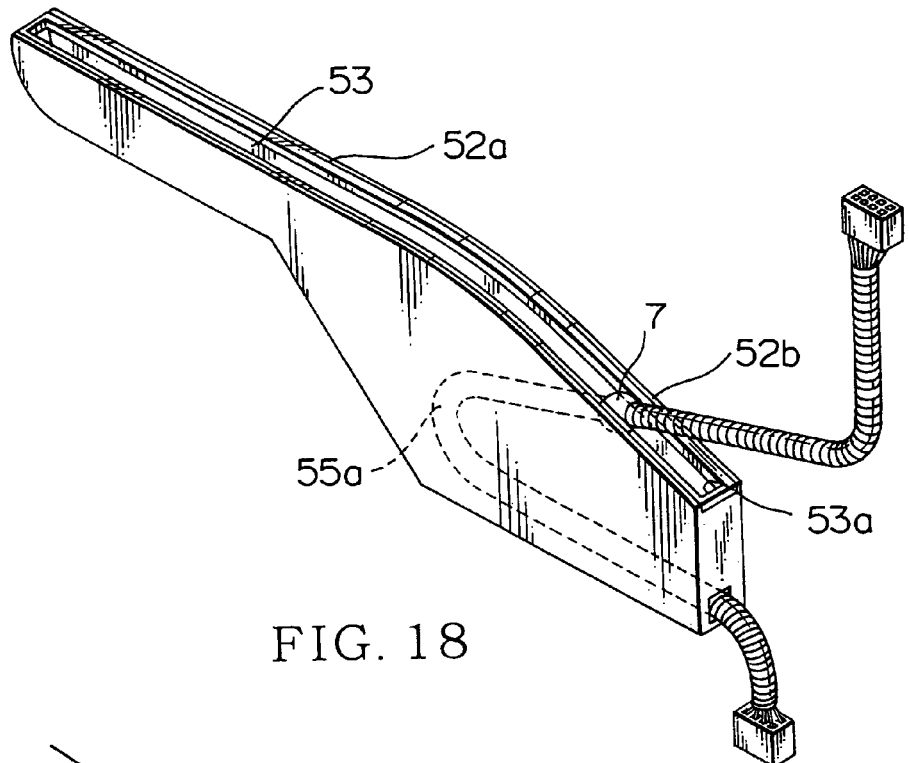
FIG. 18 is a perspective view of a feeder assembly crooked.

A feeder assembly 51 absorbs the slack of a wiring harness 52 when the sliding door (sliding structure body) of a vehicle is opened and closed. As shown in FIGS. 17 and 18, the feeder assembly 51 is provided, at a wall 52 of the long side, with a long sideways protector 54 made of synthetic resin having a long slit-opening 53 for guiding a harness (swing side) and a generally spherical sliding member 7 which is provided in the wiring harness, which bends to U or J shape in the space of the protector 54 and slides along the long opening 53.

The protector 54 is formed with a broad portion 56 at the front and a restricted portion 57 at the back and is surrounded by four walls and has a space inside for bending a harness. It is possible to form the protector 54 with a case and a cover as the embodiment of FIG. 1. The wall 52 of the long side having the opening 53 is formed with a long straight portion 52a and a short slant portion 52b and both 52a and 52b continue smoothly in curvature. The slant portion 52b intersects with a short wall 58 in which an opening 59 is provided for guiding a harness (fixed side).

A wiring harness 55 is guided out of the both openings 53 and 59 to outside and freely bends inside the protector 54 and forms a bending portion 55a (FIG. 18) with U-shape therein. The sliding member 7 is fixed at the circumference of the wiring harness 55. Both length of the wiring harness from the sliding member 7 to the fixed side opening 59 and from the sliding member 7 to a movable connector 60 are not changed. The wall 52 of the long side operates as a sliding guide and stopper for the sliding member 7.

The long opening 53 is provided in the middle of the width of the wall 52 of the long side and is extended near to the short walls 58 and 71 of front and back. The inner face of the wall 52 to both sides of the width of the long opening 53 operates as the sliding guide for the sliding member 7 Since the sliding member 7 is the same as the embodiment of FIG. 1 and its detailed explanation is omitted. The sliding member 7 may be integrated with or separated from a circumferential corrugated tube 72 of the wiring harness 55. The corrugated tube 72 is provided with circumferential concave groove and convex chamfer alternately along the longitudinal direction and has a good bending property and electric cable protection.

Figure 19:
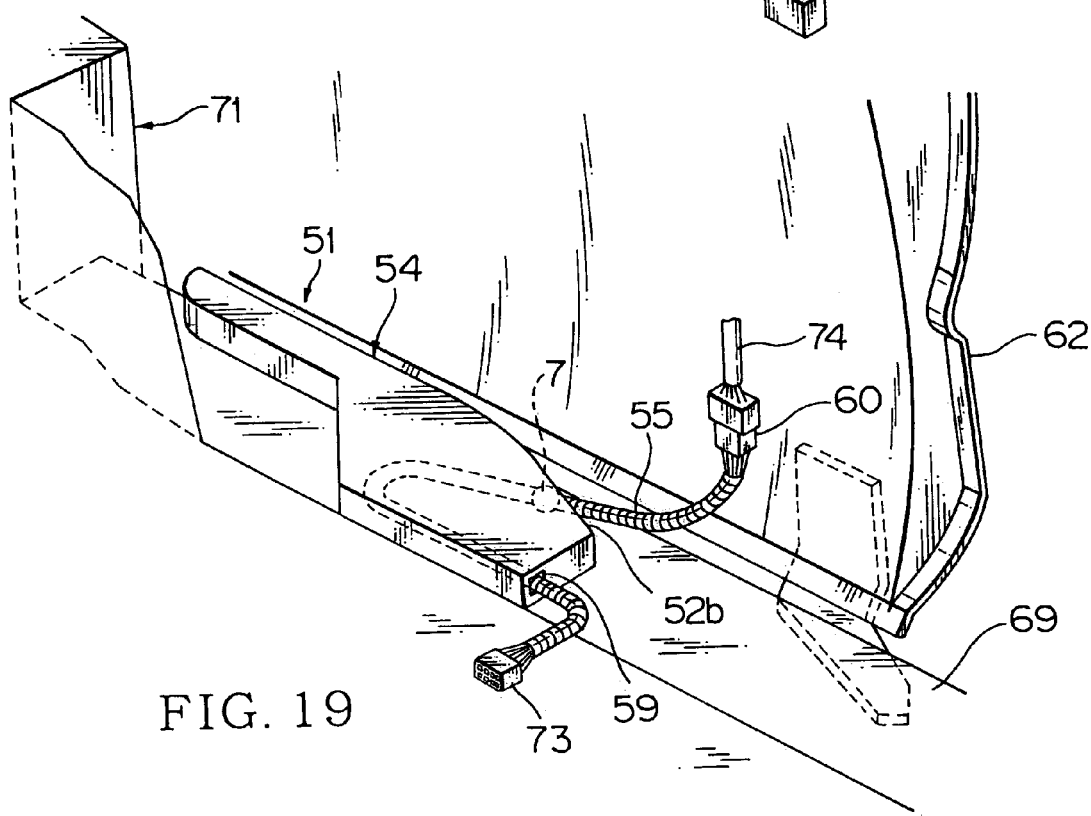
FIG. 19 is a perspective view of a sliding door fully closed showing a harness arrangement structure utilizing a feeder assembly.
Figure 22:
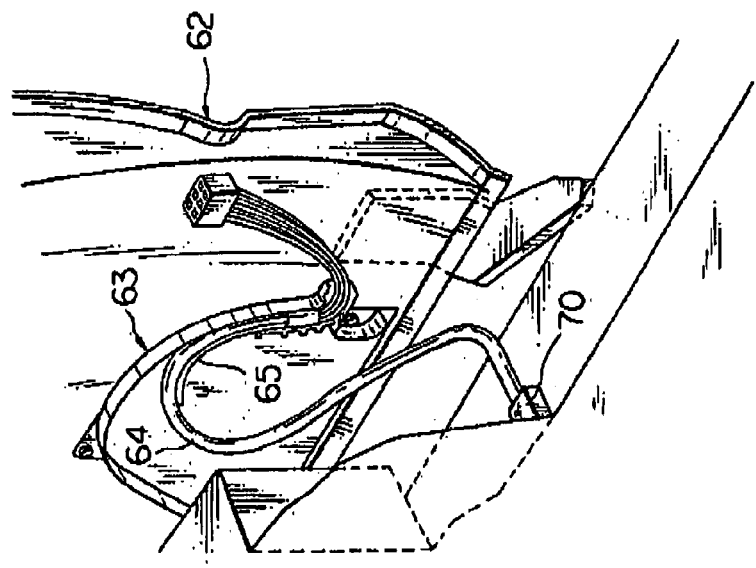
FIG. 22 is a perspective view of a sliding door fully opened showing a conventional feeder assembly and a harness arrangement structure utilizing it.
Figure 20:
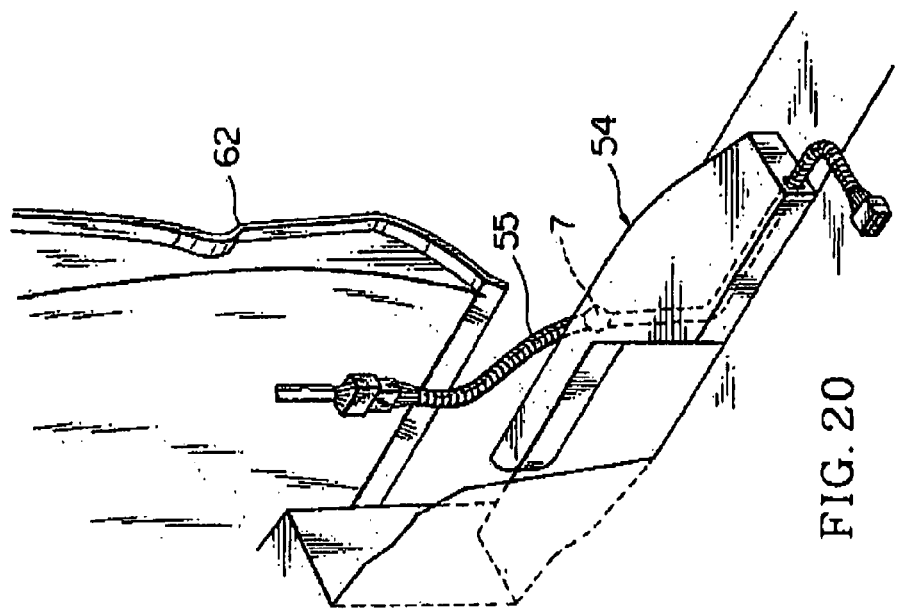
FIG. 20 is a perspective view of a sliding door fully opened showing a harness arrangement structure.
Figure 21:
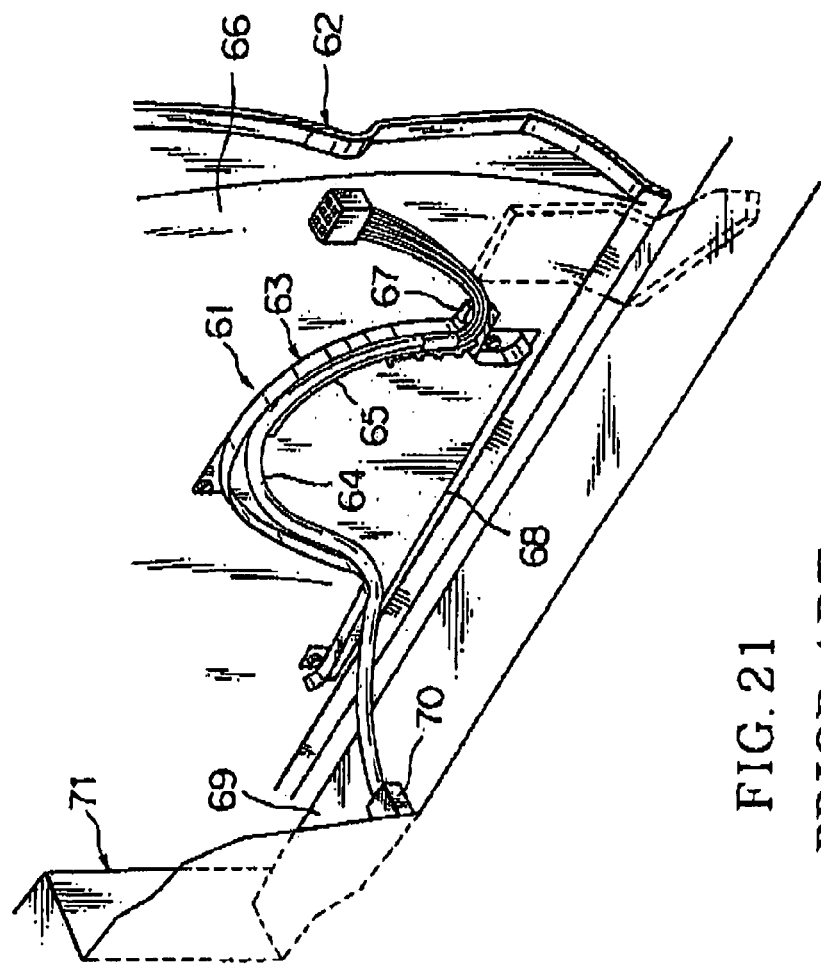
FIG. 21 is a perspective view of a sliding door fully closed showing a conventional feeder assembly and a harness arrangement structure utilizing it.

The above feeder assembly 51 is disposed horizontally at the back side of a step 69 of a vehicle body (fixed structure body) 71 as shown in FIGS. 19 and 20. One side of the wiring harness 55 is arranged horizontally from the fixed side opening 59 of the protector 54 to the vehicle body 71 and is connected to the wiring harness (not shown) of the vehicle body side at a connector 73. The other side of the wiring harness 55 is arranged horizontally from the movable long opening 53 (FIG. 17) to the side of the sliding door 62 and is connected to a wiring harness 74 of the sliding door side at a connector 60.

When a sliding door 62 fully closed as in FIG. 19, the wiring harness 55 is bent in generally U-shape in the protector 54 as shown in FIG. 18 and is guided out front. The sliding member 7 moves (contacts) along the slanted portion 52b of the wall 52 of the protector 54 and is positioned to the side of the front end 53a of the opening 53.

As the sliding door 62 moves back from the fully closed position of FIG. 19, the wiring harness 55 extends and is expanded backward in the protector 54 as shown in FIG. 20 and swings along the long opening 53. The sliding member 7 moves along the straight portion 52a from the slanted portion 52b of the wall (sliding guide) 52 of FIG. 18 and is apart from the straight portion 52a to locate inside the protector 54 as shown in FIG. 17 when the sliding door 62 fully opened as in FIG. 20.

The slanted portion 52b of the wall 52 of the protector 54 absorbs the stroke of the thickness direction of the sliding door when the sliding door 62 is opened outward the vehicle from the fully closed state or when the sliding door 62 is fully closed inward the vehicle from the almost closed state. The sliding member 7 is guided along the slanted portion 52b so that the stroke of the thickness direction of the sliding door 62 is smoothly absorbed and the sag of the wiring harness 55 is prevented.

It is also possible to substitute the pin-like sliding member 7' of FIG. 5 for the spherical sliding member 7 of the embodiment of FIG. 17. In this case, the inner face of the wall 52 to the both sides of the width direction of the long opening 53 operates as a sliding guide for the sliding member 7'. The guiding through-hole 5' same as FIG. 5 may be provided in the wall (numerals 56 and 57 in FIG. 17) of the both sides of the protector 54 along the long opening 53 with down-turning of corners.

If the protector 54 is formed within the thickness of the sliding door 62 at FIG. 19, it is capable of disposing the protector 54 horizontally to the sliding door side instead of the vehicle body side. In this case, the protector 54 is disposed symmetrical to FIG. 19 and the slanted portion 52b of the wall 52 (sliding guide) absorbs the stroke of the thickness direction of the sliding door.

When the protector 54 is disposed perpendicular to the sliding door 62, the protector 54 is reversed back and forth as to FIG. 19 and the sliding member 7 is positioned to contact the slanted portion 52b of the sliding guide 52 at the almost closed position of the sliding door 62 so as to absorb the stroke of the thickness direction of the sliding door. It is preferable to provide the long opening 53 at the lower end side (close to the wall 52) of the perpendicular wall (Numerals 56 and 57 in FIG. 17).

Moreover, the protector 54 in the horizontal position as in FIG. 19 may be disposed in the sliding seat 46 or the floor panel 50 as shown in FIGS. 14 and 15. In this case, the slanted portion 52b of the sliding guide 52 is positioned close to the sliding seat 46 to absorb the sag of the wiring harness 55.

In FIG. 19, the protector 54 maybe integrated to the vehicle body 71, vehicle panel or the like (without using the protector, 54) and the long opening 53 to guide the sliding member 7 may be provided in the vehicle body 71 or panel. This constitution is also adapted to the case of disposing the protector 54 to the sliding door side or the sliding seat side.

The electric cable 24 or protection tube 28 with a stable rigidity for temperature and humidity changes in FIGS. 6 and 7 may be utilized in the wiring harness 55 of the embodiment in FIG. 17 and the rigid member 29 of FIG. 8 may also be provided in the bending portion 55a (FIG. 18) of the wiring harness 55.

INDUSTRIAL APPLICABILITY

According to the invention, a sliding member of a wiring harness side moves along a sliding guide of a space side. A loop and a bent portion of the wiring harness expands and contracts so that the excess length of the wiring harness is absorbed smoothly and assuredly by a few parts without using conventional flat spring or its fixing member. The excess length is absorbed in the radial direction of the loop portion or the bending direction of the bent portion instead of being absorbed upward so that the receiving space, for the wiring harness is saved in the height and crosswise direction. Thereby, a feeder assembly structure is simplified and attains a low cost. Accordingly, the feeder assembly or the wiring harness are incorporated with a small space into a sliding door of a vehicle or a vehicle body having a limited space in the height direction, and are utilized for many kinds of vehicle.

According to the invention, the sliding member of the wiring harness side moves along the sliding guide of the space side. The loop portion of the wiring harness expands and contracts so that the excess length of the wiring harness is absorbed smoothly and assuredly by a few parts without using conventional flat spring or its fixing member. The excess length is absorbed in the radial or crosswise direction of the loop portion instead of being absorbed upward so that the receiving space for the wiring harness is saved in the height and crosswise direction. Thereby, the feeder assembly structure is simplified and attains a low cost. Accordingly, the feeder assembly or the wiring harness are incorporated with a small space into a sliding door of a vehicle having a limited space in the height direction, and are utilized for many kinds of vehicle.

According to the invention, the sliding member of the wiring harness side moves along the sliding guide of the space side. The bent portion of the wiring harness expands and contracts so that the excess length of the wiring harness is absorbed smoothly and assuredly by a few parts without using conventional flat spring or its fixing member. The excess length is absorbed in the bending direction of the bent portion instead of being absorbed upward so that the receiving space for the wiring harness is saved in the height and crosswise direction. Thereby, the feeder assembly structure is simplified and attains a low cost. Accordingly, the feeder assembly or the wiring harness are incorporated with a small space into a sliding door of a vehicle or a vehicle body having a limited space in the height direction, and are utilized for many kinds of vehicle.

According to the invention, the sliding member of the wiring harness side moves along the sliding guide of the protector. The loop portion or the bent portion of the wiring harness expands and contracts so that the excess length of the wiring harness is absorbed smoothly and assuredly by a few parts without using conventional flat spring or its fixing member. The excess length is absorbed in the radial direction of the loop or the bending direction of the bent portion instead of being absorbed upward so that the receiving space for the wiring harness is saved in the height and crosswise direction. Thereby, the feeder assembly structure is simplified and attains a low cost. Accordingly, the feeder assembly or the wiring harness are incorporated with a small space into a sliding door of a vehicle or a vehicle body having a limited space in the height direction, and are utilized for many kinds of vehicle.

According to the invention, the sliding member moves up and down along the sliding guide with mountain shape as a sliding structure body moves. The loop portion of the wiring harness is forced to expand and contract to absorb the excess length in the radial direction of the loop portion. Compared to the conventional feeder assembly using flat spring, the space or the protector receiving a wiring harness is saved in the height direction and is minimized to expand the versatility.

According to the invention, the sliding member moves up and down along a slanted sliding guide as the sliding structure body moves. The loop portion expands and contract along the direction of the sliding guide to absorb the excess length in the crosswise direction. Compared to the conventional feeder assembly using flat spring, the space or the protector receiving a wiring harness is saved in the height direction and is minimized to expand the versatility.

According to the invention, the stroke of the thickness direction of the sliding structure body is smoothly absorbed by the slanted portion of the sliding guide so that the sag of the wiring harness outside the protector is prevented and the pinch of the wiring harness between the sliding structure body and the fixed structure body is prevented. Thereby, the reliability feeding the sliding structure body is improved.

According to the invention, even though the sliding member changes the direction with the bending or swing of the wiring harness, a spherical sliding member slides always smoothly on a pair of rails so that the excess length of the wiring harness is smoothly and assuredly absorbed.

According to the invention, an axis is engaged with a guiding through-hole or a guiding groove and the position of the sliding member is accurately regulated so that the formation of the loop portion of the wiring harness, that is, the absorption of the excess length is smoothly and assuredly made.

According to the invention, since a long sidewall of the protector combines with the sliding guide, the structure is simplified and attains a low cost and the protector is made compact since the space inside the protector is fully utilized. Thereby, a protector can be incorporated in the sliding door of a vehicle or a vehicle body having a limited space in the height direction and can be made many kinds of vehicle versatile.

According to the invention, as the sliding structure body moves back and forth, the wiring harness swings back and forth along the long opening and the loop portion expands and contracts or the bent portion expands so that the excess length of the wiring harness is smoothly and assuredly absorbed corresponding to the back-and-forth movement of the sliding door and the movement outward apart from the vehicle body.

According to the invention, the wiring harness is always bent in loop shape without losing the shape even high temperature and humidity and the excess length of the wiring harness is smoothly and assuredly absorbed and the reliability of feeding the sliding structure body is improved. The only change is the material of the insulating cover of electric cable and the shape of the electric cable is the same as the conventional cable. Then, with the high versatility, it is adapted with a low cost to any type of the sliding structure body without using a special electric cable.

According to the invention, the wiring harness is always bent in loop shape without losing the shape even high temperature and humidity and the excess length of the wiring harness is smoothly and assuredly absorbed and the reliability of feeding the sliding structure body is improved. The only change is the material of the protection tube and the shape of the protection tube is the same as the conventional tube. Then, with the high versatility, it is adapted with a low cost to any type of the sliding structure body without using a special electric cable.

According to the invention, the loop portion or bent portion of the wiring harness expands and contracts, or bends while always keeping the bending shape with a rigid member, and the excess length of the wiring harness is smoothly and assuredly absorbed and the reliability of feeding the sliding structure body is improved.

According to the invention, the sliding member of the wiring harness side moves along the sliding guide of the space side. The loop and bent portion of the wiring harness expands and contracts so that the excess length of the wiring harness is absorbed smoothly and assuredly by a few parts without using conventional flat spring or its fixing member. The excess length is absorbed in the radial direction of the loop portion or the bending direction of the bent portion instead of being absorbed upward so that the receiving space for the wiring harness is saved in the height direction. Thereby, the feeder assembly structure is simplified and attains a low cost. Accordingly, the feeder assembly or the wiring harness are incorporated with a small space into a sliding door of a vehicle or a vehicle body having a limited space in the height direction, and are utilized for many kinds of vehicle.

According to the invention, the sliding member of the wiring harness side moves along the sliding guide inside the protector. The loop portion or the bent portion of the wiring harness expands and contracts so that the excess length of the wiring harness is absorbed smoothly and assuredly by a few parts without using conventional flat spring or its fixing member. The excess length is absorbed in the radial direction of the loop portion or the bending direction of the bent portion instead of being absorbed upward so that the protector is made compact in the height direction. Thereby, the structure is simplified and attains a low cost. Accordingly, the protector is incorporated with a small space into the sliding door of a vehicle or a vehicle body having a limited space in the height or crosswise direction, and is utilized for many kinds of vehicle.

According to the invention, in the case of a sliding door, the space inside the sliding door is saved in the height direction and a feeder assembly is easily incorporated in the sliding door. In the case of a seat, the space under the seat is utilized effectively and can be saved in the horizontal width direction and it is capable of disposing compactly a feeder assembly. The versatility of feeder assembly attains a low cost.

The invention claimed is:

1. A feeder assembly comprising:
a space receiving a wiring harness to be bent;
a sliding member provided in the wiring harness;
and a sliding guide, being formed as one of a mountain shape, slanted from one end to another end, and having a straight portion and a slanted portion following the straight portion, being provided in the space, to guide the sliding member, wherein
the space is provided in a protector and the sliding guide is provided in the lengthwise direction of the protector, and
a long opening to swing the wiring harness is provided in the lengthwise direction of the protector and an opening of the wiring fixing side is provided in one end side of the protector.

2. The feeder assembly according to claim 1, further comprising the space receiving the wiring harness bent in loop shape and the sliding guide to guide the sliding member to the direction to which a loop portion of the wiring harness expands or contracts the diameter.

3. The feeder assembly according to claim 1, further comprising the space receiving the wiring harness bent in U-shape and the sliding guide to guide the sliding member to the direction to which a bent portion of the wiring harness expands or contracts.

4. The feeder assembly according to claim 1, wherein the sliding guide is a pair of rails opposed to each other, the wiring harness is inserted between the pair of rails, and the sliding member is a spherical member which contacts to slide freely on the pair of rails.

5. The feeder assembly according to claim 1, wherein the sliding guide is a pair of guiding through-holes or guiding grooves opposed to each other and the sliding member has an axis which engages to slide freely on the guiding through-holes or the guiding grooves.

6. The feeder assembly according to claim 1, wherein the sliding guide is a wall of a long side of the protector.

7. The feeder assembly according to claim 1, wherein an insulating cover of each electric cable constituting the wiring harness is formed with a material which hardly degrades the rigidity with temperature and humidity changes.

8. The feeder assembly according to claim 1, wherein a protection tube covering the circumference of the wiring harness is formed with a material which hardly degrades the rigidity with temperature and humidity changes.

9. A feeder assembly comprising: a space receiving a wiring harness to be bent;

a sliding member provided in the wiring harness;

and a sliding guide, being provided in the space, to guide the sliding member, the space receiving the wiring harness bent in a loop shape and the sliding guide to guide the sliding member to the direction to which a loop portion of the wiring harness expands or contracts the diameter, wherein a curved rigid member openable at a hinge is attached to the loop portion or the bent portion of the wiring harness.

10. A harness arrangement structure utilizing a feeder assembly comprising:

the feeder assembly comprising: a space receiving a wiring harness to be bent; a sliding member provided in the wiring harness; and a sliding guide, being provided in the space to guide the sliding member, disposed in a sliding structure body or a fixed structure body;

the sliding structure body engaging to slide on the fixed structure body, the wiring harness following to the sliding member being guided out of the space to the fixed structure body or the sliding structure body side; and the wiring harness following to the loop portion being guided out and fixed to the sliding structure body or the fixed structure body side.

11. The harness arrangement structure utilizing the feeder assembly according to claim 10, wherein the feeder assembly is disposed vertically or horizontally.

12. A harness arrangement structure utilizing a feeder assembly comprising:

a space receiving a wiring harness to be bent; a sliding member provided in the wiring harness; and a sliding member provided in the wiring harness; and a sliding guide, being provided in the space, to guide the sliding member, the space is provided in a protector and the sliding guide provided in the lengthwise direction of the protector, the protector of the feeder assembly being disposed in a sliding structure body or a fixed structure body;

the sliding structure body engaging to slide the fixed structure body;

the wiring harness following to the sliding member being guided out of a long opening of the protector to the fixed structure body or the sliding structure body side; and the wiring harness following to the loop portion being guided out and fixed to the sliding structure body or the fixed structure body side.

13. The harness arrangement structure utilizing the feeder assembly according to claim 12, wherein the feeder assembly is disposed vertically or horizontally.

* * * * *

UNITED STATES PATENT AND TRADEMARK OFFICE
CERTIFICATE OF CORRECTION

PATENT NO. : 7,265,294 B2 Page 1 of 1
APPLICATION NO. : 10/519690
DATED : September 4, 2007
INVENTOR(S) : Mitsunori Tsunoda et al.

It is certified that error appears in the above-identified patent and that said Letters Patent is hereby corrected as shown below:

On the Title page of the patent:

Item
(30)    Foreign Application Priority Data

Dec. 2, 2002 (JP) ................... "2002-2349724" should read:
--2002-349724--

Signed and Sealed this

Twentieth Day of November, 2007

JON W. DUDAS
*Director of the United States Patent and Trademark Office*